United States Patent
Turnquist et al.

[11] Patent Number: 5,961,280
[45] Date of Patent: Oct. 5, 1999

[54] ANTI-HYSTERESIS BRUSH SEAL

[75] Inventors: Norman Arnold Turnquist, Cobleskill; Christopher Edward Wolfe, Niskayuna; Osman Saim Dinc, Troy, all of N.Y.

[73] Assignee: General Elecgtric Company, Schenectady, N.Y.

[21] Appl. No.: 08/928,114

[22] Filed: Sep. 12, 1997

[51] Int. Cl.[6] .................................................. F04D 29/08
[52] U.S. Cl. ...................... 415/173.3; 415/230; 277/355
[58] Field of Search ............................. 415/173.3, 170.1, 415/173.5, 174.2, 174.5, 229, 230, 231; 277/355

[56] References Cited

U.S. PATENT DOCUMENTS

| | | | |
|---|---|---|---|
| 885,032 | 4/1908 | Ferranti | 415/173.3 |
| 4,971,336 | 11/1990 | Ferguson | 415/174.5 |
| 4,989,886 | 2/1991 | Rulis | 277/355 |
| 5,176,389 | 1/1993 | Noone et al. | 277/355 |
| 5,201,530 | 4/1993 | Kelch et al. | 415/174.2 |
| 5,568,931 | 10/1996 | Tseng et al. | 415/230 |
| 5,613,829 | 3/1997 | Wolfe et al. | 415/174.1 |
| 5,688,105 | 11/1997 | Hoffelner | 415/170.1 |
| 5,755,445 | 5/1998 | Arora | 415/173.5 |

*Primary Examiner*—Edward K. Look
*Assistant Examiner*—Richard Woo
*Attorney, Agent, or Firm*—Douglas E. Erickson; Marvin Snyder

[57] ABSTRACT

A brush seal which, among other applications, may be used for sealing a steam leakage gap between a steam turbine rotor and a steam turbine casing. A brush seal backing plate has a surface which includes adjacent first and second areas. First and second bristle packets contact and generally cover, respectively, the first and second areas. A first anti-hysteresis plate is positioned between and contacts the first and second bristle packets, is aligned generally perpendicular to the backing plate, and is proximate and generally spaced apart from the backing plate. The anti-hysteresis plate restores the bristles which would otherwise become set in a non-sealing position against the backing plate because of transient events such as thermal differential growth or relative movement of the rotor and casing.

11 Claims, 2 Drawing Sheets

ANTI-HYSTERESIS BRUSH SEAL

FIELD OF THE INVENTION

The present invention relates generally to brush seals, and more particularly to a brush seal which minimizes hysteresis behavior.

BACKGROUND OF THE INVENTION

Brush seals are used to minimize leakage through a gap between two components, wherein such leakage is from a higher pressure area to a lower pressure area. The two components may both be rotating, may both be stationary, or one may be rotating and the other stationary. Brush seals may have any shape including, but not limited to, annular or straight. Brush seals have been used, or their use proposed, in rotating machinery such as, but not limited to, turbomachinery including steam turbines and gas turbines used for power generation and gas turbines used for aircraft and marine propulsion. It is noted that brush seals prevent the leakage of steam in steam turbines and prevent the leakage of compressed air or combustion gases in gas turbines.

A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine area of a gas turbine (such as between the rotating tips of turbine rotor blades and the circumferentially surrounding turbine casing) will lower the efficiency of the gas turbine leading to increased fuel costs. Also, gas-path leakage in the combustor area of a gas turbine will require an increase in burn temperature to maintain power level, such increased burn temperature leading to increased pollution, such as increased NOx and CO production.

Gas-path leakage occurs through gaps between larger gas turbine components such as through gaps between the combustor and the turbine, and gas-path leakage occurs through gaps between smaller gas turbine components such as through gaps between combustor casing segments. Such components have surfaces of different shapes, suffer from assembly misalignment, and undergo vibration. For example, vibration is particularly important during startup of a turbine rotor which must pass through one or more critical frequencies before reaching operational speed. Also, hot-section components, such as rotors and circumferentially surrounding stators, thermally experience hot gas flow and typically undergo different thermal growths. Even rotor blades (also called buckets) in the same circumferential row experience different thermal or centrifugal growths leading to "bumps" (i.e., different radial clearance gaps). Steam-path leakage occurs through gaps between steam turbine components in a manner similar to that for gas-path leakage through gaps between gas turbine components.

Conventional brush seal designs have been proposed for use in gas-path leakage gaps of gas turbines and for use in steam-path leakage gaps of steam turbines. Such brush seals have wire or ceramic bristles conventionally welded or otherwise affixed to a backing plate. Typically, such brush seals align their wire bristles to contact a rotating shaft at an angle between generally forty-five and generally sixty degrees with respect to a radius line from the shaft to the point of bristle contact, such bristle alignment creating a softer, longer-wearing brush-seal contact.

The problem of brush seal hysteresis is known in the art. Gas or steam from the higher pressure area will set the bristles against the backing plate during periods when the gap between the two components is smaller (due to differential thermal growth, vibration, or "bumps") and the bristle ends touch, and are deflected by, one of the components. Such bristles will stay set and such bristle ends will be spaced further apart from the one component when the gap returns to normal size. Such bristle set (i.e., hysteresis) causes greater leakage and renders the brush seal largely ineffective. Equalizing the pressure on both sides of the gap will release the bristles. A known technique is to direct some higher pressure gas or steam from the front to behind the bristles to prevent the bristles from being set against the backing plate. However, such gas or steam bypass is itself an undesirable gas or steam leakage.

What is needed is an improved brush seal which prevents hysteresis without directing any higher pressure gas or steam from the front to behind the bristles.

SUMMARY OF THE INVENTION

The brush seal of the invention includes a brush-seal backing plate, first and second bristle packets, and a first anti-hysteresis plate. The backing plate has a surface which includes adjacent first and second areas. The first bristle packet contacts and generally covers the first area, and the second bristle packet contacts and generally covers the second area. The first anti-hysteresis plate is located between and contacts the first and second bristle packets, is aligned generally perpendicular to the backing plate, and is proximate and generally spaced apart from the backing plate.

Preferably, the first and second areas extend between, and generally to, opposing first and second edges of the backing plate, the first bristle packet has a secured end attached to the backing plate proximate the first edge and has a free end overhanging the second edge, and the second bristle packet has a secured end attached to the backing plate proximate the first edge and has a free end overhanging the second edge. In an exemplary construction, the first anti-hysteresis plate has opposing first and second ends, the first end is attached to the backing plate proximate the first edge of the backing plate, the second end is generally even with the second edge of the backing plate, and the first anti-hysteresis plate is spaced apart from the backing plate from the second end to generally the first end.

Several benefits and advantages are derived from the invention. A brush seal constructed of alternating anti-hysteresis plates and bristle packets will have the resilient action of the anti-hysteresis plates overcome the "bristle set" to return the bristle packets to normal extension in a normal-sized gap after a thermal or vibratory or "bump" transient event. Such transient event causes the gap to shrink which deflects the bristles which are set against the backing plate by the pressure differential. The set bristles would not return to normal extension in a normal-sized gap without the presence and restoring action of the anti-hysteresis plates. Engineering analysis indicates the brush seal of the invention can result in a one-to-two percent reduction in gas or steam leakage which, in gas or steam turbines used for power generation, could result in savings of tens of thousands of dollars per year per turbine.

DETAILED DESCRIPTION OF THE INVENTION

Figure 1:
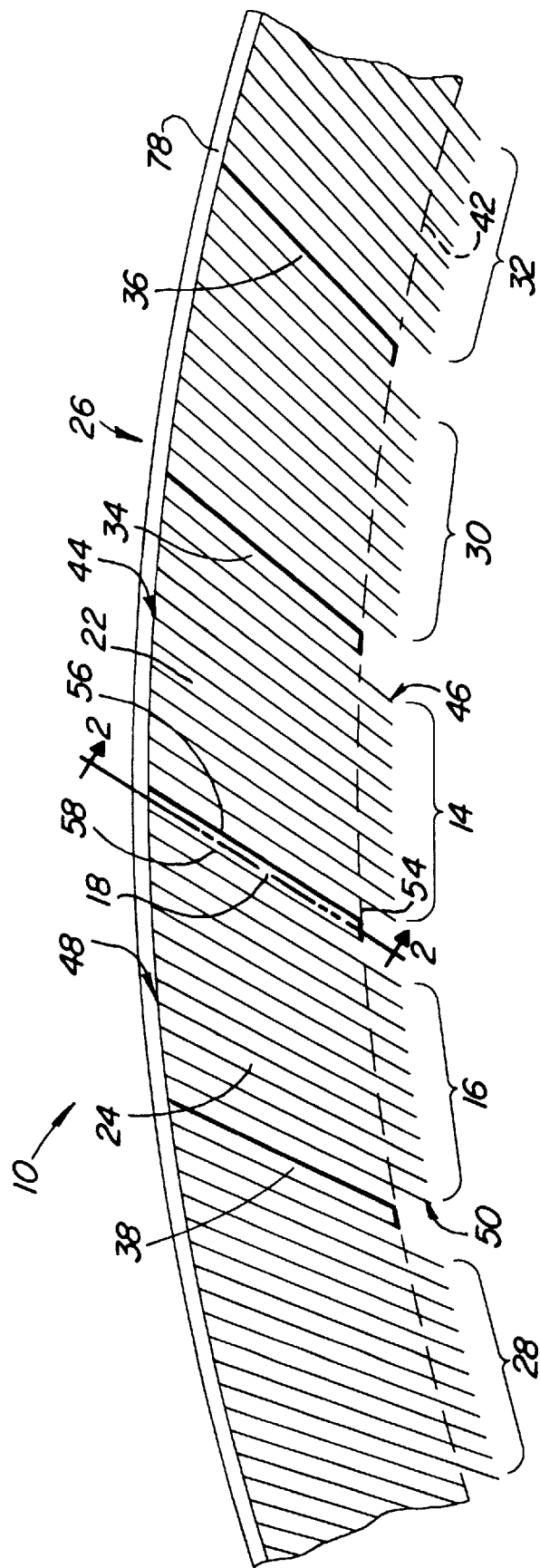
FIG. 1 is a schematic front view of a section of a preferred embodiment of the brush seal of the present invention showing four anti-hysteresis plates and five bristle packets.
Figure 2:
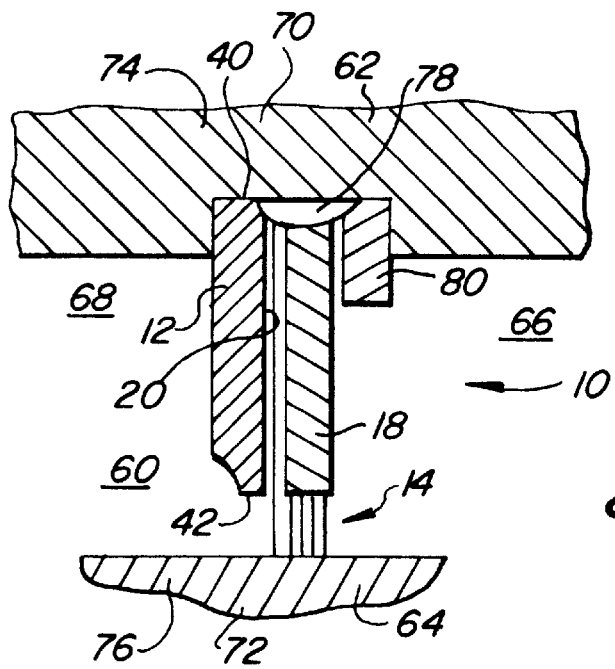
FIG. 2 is a sectional view of the brush seal of FIG. 1, taken along arrows 2—2 of FIG. 1, together with a front plate and a typical brush seal installation.
Figure 3:
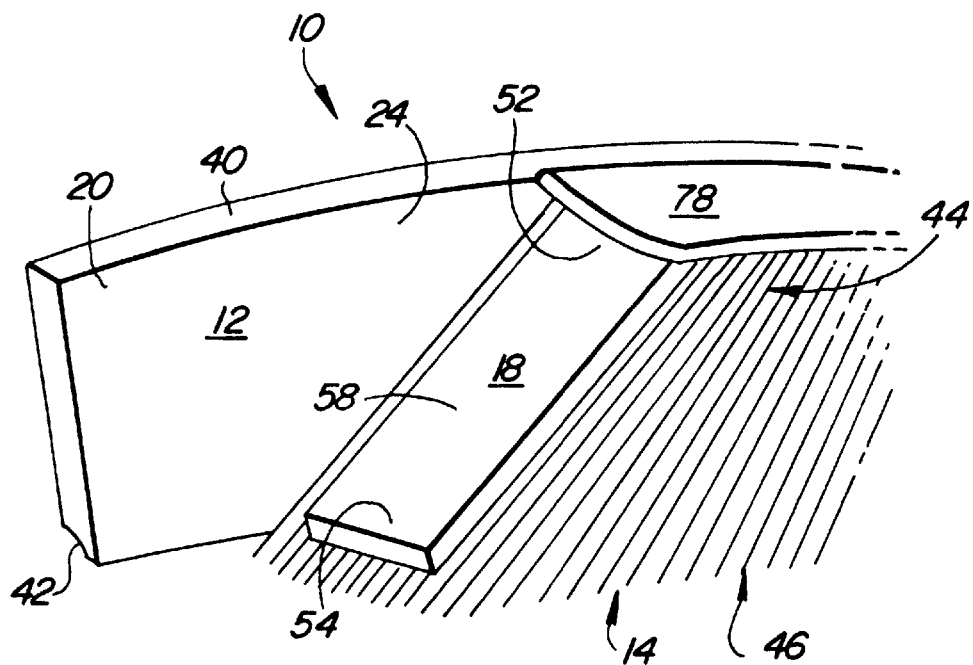
FIG. 3 is a cutaway perspective view of a portion of the brush seal of FIG. 1.

Referring now to the drawings, wherein like numerals represent like elements throughout, FIGS. 1 through 3 schematically show a preferred embodiment of the brush seal 10 of the present invention. The brush seal 10 includes a brush-seal backing plate 12, a first bristle packet 14, a second bristle packet 16, and a first anti-hysteresis plate 18. The backing plate 12 has a surface 20 which includes adjacent first and second areas 22 and 24. The first bristle packet 14 contacts and generally covers the first area 22, and the second bristle packet 16 contacts and generally covers the second area 24. The first anti-hysteresis plate 18 is disposed between and contacts the first and second bristle packets 14 and 16, is aligned generally perpendicular to the backing plate 12, and is proximate and generally spaced apart from the backing plate 12.

The backing plate 12 can have any shape including, without limitation, a straight or curved shape. Preferably, the backing plate 12 is a segment 26 of an annular ring, and the brush seal 10 further includes third, fourth, and fifth bristle packets 28, 30, and 32 and second, third, and fourth anti-hysteresis plates 34, 36, and 38, wherein adjacent anti-hysteresis plates are generally equally circumferentially spaced apart. In an exemplary construction, the backing plate 12 has opposing first and second edges 40 and 42, the surface 20 of the backing plate 12 is partially bounded by the first and second edges 40 and 42, and the first and second areas 22 and 24 of the surface 20 of the backing plate 12 extend between and generally to the first and second edges 40 and 42 of the backing plate 12.

It is preferred that the first bristle packet 14 have a secured end 44 attached to the backing plate 12 proximate the first edge 40 of the backing plate 12 and have a free end 46 overhanging the second edge 42 of the backing plate 12. Likewise, it is preferred that the second bristle packet 16 have a secured end 48 attached to the backing plate 12 proximate the first edge 40 of the backing plate 12 and have a free end 50 overhanging the second edge 42 of the backing plate 12. It is understood that, in describing the present brush seal invention, when a first part is described as being attached to a second part, such first part may be directly or indirectly attached to such second part. It is noted that a bristle packet (such as the first bristle packet 14) is a group of brush-seal bristles disposed generally circumferentially between two adjacent anti-hysteresis plates (such as adjacent first and second anti-hysteresis plates 18 and 34). It is noted that some brush-seal bristles of a bristle packet may be disposed in the space between an anti-hysteresis plate and the backing plate and other brush-seal bristles of a bristle packet may be disposed in the area in front of (i.e. as viewed in FIG. 1) the anti-hysteresis plate, such area shown devoid of such bristles in FIG. 1. Brush seal bristles include, without limitation, metal wire bristles and ceramic wire bristles.

In an exemplary embodiment, the first anti-hysteresis plate 18 has opposing first and second ends 52 and 54, wherein the first end 52 is attached to the backing plate 12 proximate the first edge 40 of the backing plate 12 and the second end 54 is generally even with the second edge 42 of the backing plate 12. In this construction, preferably the first anti-hysteresis plate 18 from its second end 54 to generally its first end 52 is spaced apart from the backing plate 12. The first anti-hysteresis plate 18 is a generally planar and generally rectangular plate having opposing first and second sides 56 and 58, wherein the first bristle packet 14 abuttingly covers generally the entire first side 56 and the second bristle packet 16 abuttingly covers generally the entire second side 58. Preferably, the first anti-hysteresis plate 18 is aligned off-perpendicular to a geometrical (i.e. imaginary) plane which is tangent to the segment 26 of the annular ring at the first end 52 of the first anti-hysteresis plate 18. In other words, the first anti-hysteresis plate is not aligned along a geometrical radius line which extends from the center of the annular ring to the first anti-hysteresis plate. It is understood that the terminology "anti-hysteresis plate" is used merely to descriptively distinguish this plate from the backing plate, and that, in describing the present brush seal invention, the first anti-hysteresis plate could have simply been called a "first plate".

In a preferred application, as shown in the bush seal installation of FIG. 2, the brush seal 10 of the invention is for generally sealing a leakage gap 60 between spaced-apart first and second components 62 and 64, wherein the gap 60 has a higher pressure side 66 and a lower pressure side 68. Preferably, the leakage gap is a steam-leakage gap or a gas-leakage gap wherein the word "gas" includes compressed air or combustion gas. The backing plate 12 is disposed in the gap 60, is attached to the first component 62, and is spaced-apart from the second component 64. The surface 20 of the backing plate 12 faces the higher pressure side 66, the free end 46 of the first bristle packet 14 extends towards and at least proximate the second component 64, and the free end 50 of the second bristle packet 16 extends towards and at least proximate the second component 64. In some applications, the brush seal is designed to have the free ends of the bristle packets be spaced a small distance apart from the second component during steady-state operation. In other applications the free ends of the bristle packets, including the free end 46 of the first bristle packet 14 and the free end 50 of the second bristle packet 16, contact the second component 64 during steady-state operation. Such steady-state contact of the free ends of the bristle packets with the second component may be a slight contact or an interference contact as determined by the artisan.

In an exemplary embodiment, the first component 62 is a stator 70, the second component 64 is a rotor 72, and the stator 70 circumferentially surrounds the rotor 72. Only a portion of the stator 70 and rotor 72 are shown in FIG. 2. Preferably, the stator 70 is a turbine casing 74, and the rotor 72 is a turbine rotor 76. In a favored application, the leakage gap 60 is a steam-leakage gap, the turbine casing 74 is a steam turbine casing, and the turbine rotor 76 is a steam turbine rotor. It is noted that a rotor typically includes a shaft or disc and also typically includes axially spaced-apart circumferential rows of circumferentially spaced apart blades (i.e., buckets) radially extending from the shaft or disc. In a first preferred brush seal installation the free ends of the bristle packets touch the rotating blade tips, while in a second preferred brush seal installation the free ends of the bristle packets touch the shaft or disc.

Those skilled in the art can appreciate that the brush seal 10 of the present invention can be made by introducing the anti-hysteresis plates 18, 34, 36, and 38 into a conventional brush seal. The number, size, shape, spacing, stiffness, composition, etc. of the anti-hysteresis plates is left to the artisan in that these parameters can be determined analytically or experimentally such that the anti-hysteresis plates function to overcome any bristle set experienced during transient operations (e.g., differential thermal growth, vibration, "bumps", and the like) of the brush seal. Preferably, the first end 52 of the first anti-hysteresis plate 18 is attached to the backing plate 12 by a weldment 78, and a brush-seal front plate 80 is employed as in a conventional brush seal design but with such front plate 80 typically being generally spaced apart from the anti-hysteresis plates such as the first anti-hysteresis plate 18.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brush seal comprising:
   a) a brush-seal backing plate having a surface which includes adjacent first and second areas;
   b) a first bristle packet contacting and generally covering said first area;
   c) a second bristle packet contacting and generally covering said second area; and
   d) a first anti-hysteresis plate which is disposed between and contacting said first and second bristle packets, which is aligned generally perpendicular to said backing plate, which is proximate and generally spaced apart from said backing plate, and which exerts only a restoring force on said first and second bristle packets.

2. The brush seal of claim 1,
   wherein said backing plate has opposing first and second edges;
   wherein said surface of said backing plate is partially bounded by said first and second edges;
   wherein said first and second areas of said surface of said backing plate extend between, and generally to, said first and second edges;
   wherein said first bristle packet has a secured end attached to said backing plate proximate said first edge and has a free end overhanging said second edge; and
   wherein said second bristle packet has a secured end attached to said backing plate proximate said first edge and has a free end overhanging said second edge.

3. The brush seal of claim 2,
   wherein said first anti-hysteresis plate has opposing first and second ends;
   wherein said first end is attached to said backing plate proximate said first edge of said backing plate;
   wherein said second end is generally even with said second edge of said backing plate; and
   wherein said first anti-hysteresis plate from said second end to generally said first end is spaced apart from said backing plate.

4. The brush seal of claim 3,
   wherein said first anti-hysteresis plate is a generally planar and generally rectangular plate having opposing first and second sides;
   wherein said first bristle packet abuttingly covers generally the entire first side; and
   wherein said second bristle packet abuttingly covers generally the entire second side.

5. A brush seal comprising:
   a) a brush-seal backing plate having a surface which includes adjacent first and second areas;
   b) a first bristle packet contacting and generally covering said first area;
   c) a second bristle packet contacting and generally covering said second area; and
   d) a first anti-hysteresis plate which is disposed between and contacting said first and second bristle packets, which is aligned generally perpendicular to said backing plate, which is proximate and generally spaced apart from said backing plate, and which exerts only a restoring force on said first and second bristle packets;
   wherein said backing plate has opposing first and second edges;
   wherein said surface of said backing plate is partially bounded by said first and second edges;
   wherein said first and second areas of said surface of said backing plate extend between, and generally to, said first and second edges;
   wherein said first bristle packet has a secured end attached to said backing plate proximate said first edge and has a free end overhanging said second edge;
   wherein said second bristle packet has a secured end attached to said backing plate proximate said first edge and has a free end overhanging said second edge;
   wherein said first anti-hysteresis plate has opposing first and second ends;
   wherein said first end is attached to said backing plate proximate said first edge of said backing plate;
   wherein said second end is generally even with said second edge of said backing plate;
   wherein said first anti-hysteresis plate from said second end to generally said first end is spaced apart from said backing plate;
   wherein said first anti-hysteresis plate is a generally planar and generally rectangular plate having opposing first and second sides;
   wherein said first bristle packet abuttingly covers generally the entire first side;
   wherein said second bristle packet abuttingly covers generally the entire second side;
   wherein said backing plate is a segment of an annular ring; and
   wherein said first and second bristle packets and said first anti-hysteresis plate each are aligned in a relaxed state at a generally-identical angle which is off-perpendicular to a geometrical plane which is tangent to said segment of said annular ring at said first end of said first anti-hysteresis plate.

6. The brush seal of claim 5 for generally sealing a leakage gap between spaced-apart first and second components,
   wherein said gap has a higher pressure side and a lower pressure side;
   wherein said backing plate is disposed in said gap, is attached to said first component, and is spaced-apart from said second component;
   wherein said surface of said backing plate faces said higher pressure side;
   wherein said free end of said first bristle packet extends towards and at least proximate said second component; and wherein said free end of said second bristle packet extends towards and at least proximate said second component.

7. The brush seal of claim 6, wherein said free end of said first bristle packet contacts said second component; and wherein said free end of said second bristle packet contacts said second component.

8. The brush seal of claim 7, wherein said first component is a stator and said second component is a rotor.

9. The brush seal of claim 8, wherein said stator circumferentially surrounds said rotor.

10. The brush seal of claim 9, wherein said stator is a turbine casing and said rotor is a turbine rotor.

11. The brush seal of claim 10, wherein said leakage gap is a steam-leakage gap, wherein said turbine casing is a steam turbine casing, and wherein said turbine rotor is a steam turbine rotor.

* * * * *

UNITED STATES PATENT AND TRADEMARK OFFICE
CERTIFICATE OF CORRECTION

PATENT NO. : 5,961,280
DATED : October 5, 1999
INVENTOR(S) : Norman A. Turnquist et al.

It is certified that error appears in the above-identified patent and that said Letters Patent is hereby corrected as shown below:

On the title page, item [73]

Please correct the spelling of the Assignee's name, specifically "Electric." It should be General Electric Company.

Signed and Sealed this

Sixth Day of June, 2000

Attest:

Q. TODD DICKINSON

*Attesting Officer*  *Director of Patents and Trademarks*